Jan. 30, 1962   A. H. PINKE ETAL   3,018,927
SPRAYING APPARATUS
Filed Aug. 21, 1958
2 Sheets-Sheet 1
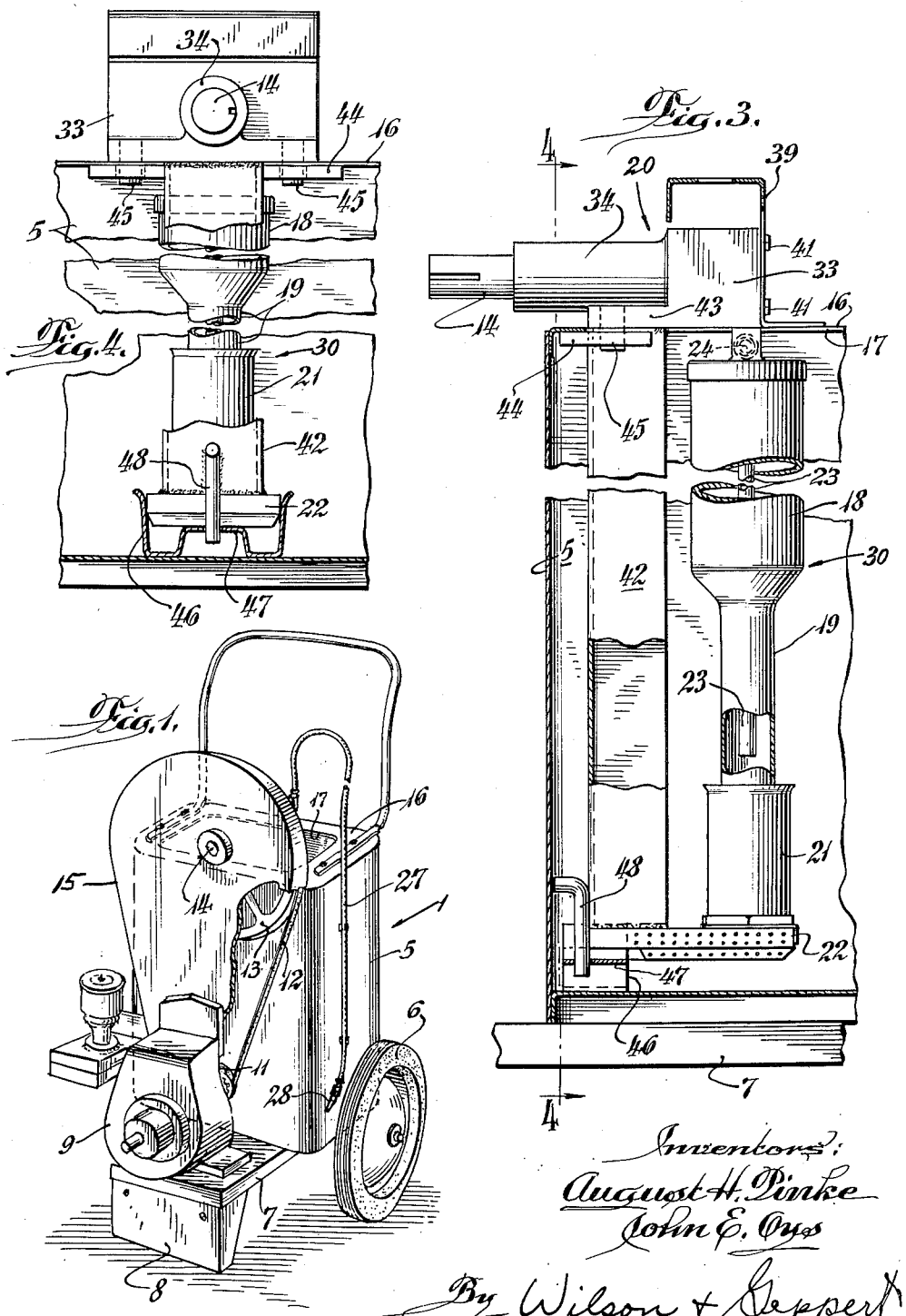

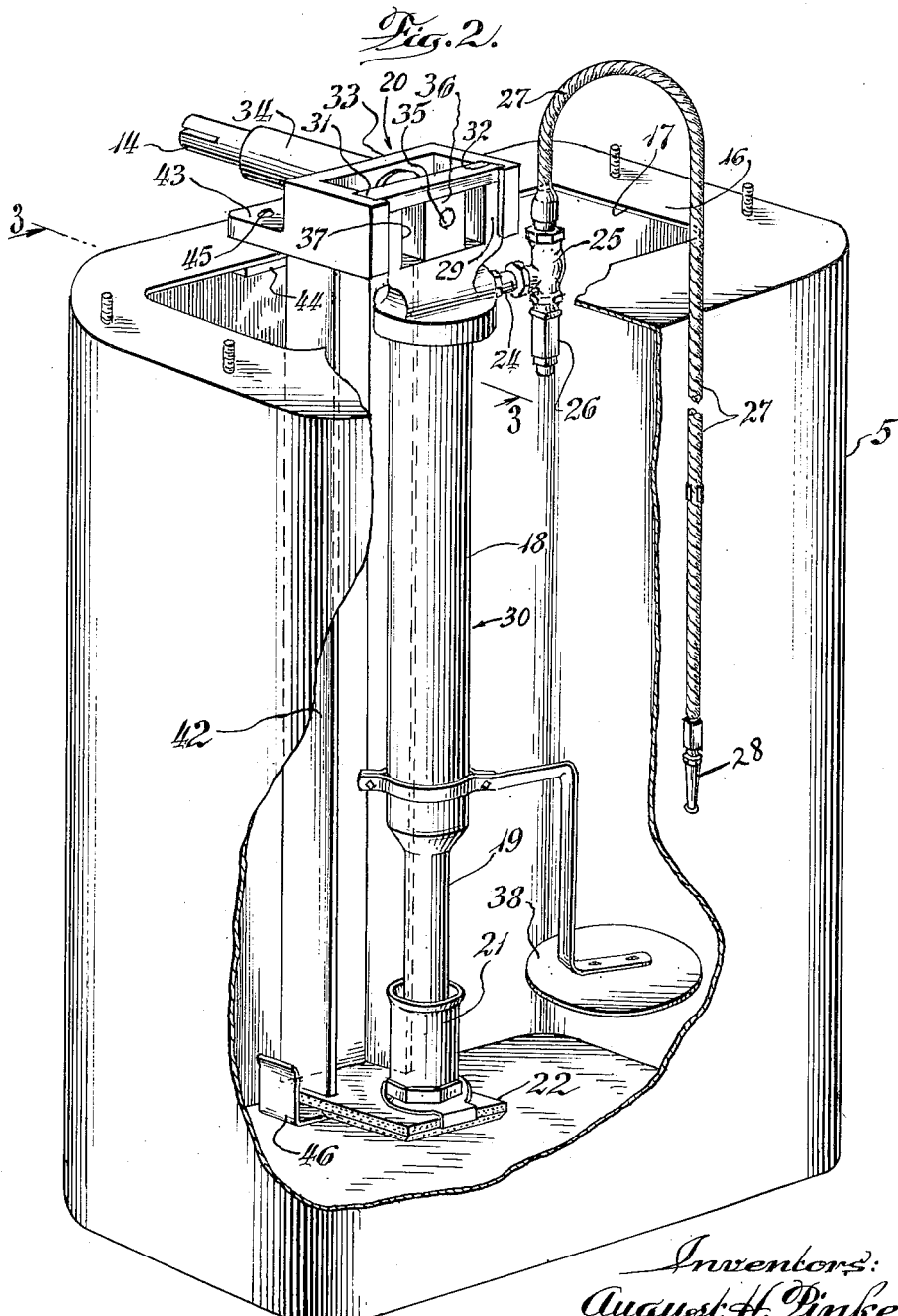

3,018,927
SPRAYING APPARATUS
August H. Pinke and John E. Oys, Hastings, Minn., assignors to H. D. Hudson Manufacturing Company, Chicago, Ill., a corporation of Minnesota
Filed Aug. 21, 1958, Ser. No. 756,485
6 Claims. (Cl. 222—333)

This invention pertains to spraying apparatus more particularly of the portable type employed in spraying for the protection of flowers, gardens, lawns, and the like from pests or weeds.

More specifically, the invention resides in the provision of a pumping unit which can be readily mounted in and easily removed from the tank in which the spraying liquid is carried. The mounting of the pumping unit in the tank in such manner that it may be demounted or detached from the tank by simply lifting it out, is a feature of value in that it enables quick and easy disassembly of the pump unit from the tank for cleaning or repair of either the tank or the pump. With our invention the disassembly of the pump from the tank can be effected without the removal or disconnection of any screws, bolts or other fasteners, since our pumping unit is retained in its assembled relation with the tank merely by the power driving belt which connects the power motor with the pump shaft. Removal of this belt from the pulley frees the pumping unit for removal from the tank.

Another feature of our invention is the provision of detachable connections between the pump unit and the tank which will not only permit the pumping unit to be lifted out of the tank without unfastening screws, bolts or other locking devices but will also facilitate the ready assembly of the pump with the tank by guiding the pumping unit into the desired assembled position.

Other purposes and advantages of our invention will be appreciated as the same becomes better understood by reference to the following description when considered in connection with the accompanying drawings.

Referring to the drawings,

FIGURE 1 is a perspective view of a spraying apparatus embodying our invention with certain parts either omitted or broken away;

FIG. 2 is an enlarged perspective view of the tank, partially broken away, and the pumping unit assembled therewith;

FIG. 3 is a sectional view substantially on the line 3—3 of FIG. 2; and

FIG. 4 is a sectional view substantially on the line 4—4 of FIG. 3.

Referring to the drawings more in detail, it will be observed from FIG. 1 that the apparatus 1 is of the portable type, comprising a tank 5 for containing the spraying liquid carried by wheels 6 and having a forwardly projecting platform 7 supported at its outer end upon an upright foot or leg 8. A motor 9 of any preferred type, but illustrated as an internal combustion engine, is mounted upon the platform 7 and provided with a drive pulley 11 which is connected through a removable belt 12 with a driven pulley 13 mounted on the shaft 14 of the pump operating mechanism 20. A shield or guard 15 may enclose the pulley 13 for safety purposes.

The upper end 16 of the tank is provided with an opening 17 through which the spraying liquid may be poured into the tank and which is adapted to be covered by a closure (not shown) of suitable shape and dimensions. Through this opening the pump 30 is lowered into the tank where it is, partially at least, submerged in the contained liquid.

While the detailed structure of the pump is not claimed as part of the present invention, it may be stated generally that it consists of a cylindrical chamber 18 terminating in a lower portion 19 of reduced diameter which carries at its lower end a conventional plunger cup adapted to be reciprocated in the cylinder 21 to act as a plunger pump. Standard or preferred intake and outlet valves cause the liquid drawn into the pump through the perforated base 22 to be forced upwardly into the chamber 18 which acts as a pressure storage chamber. The liquid in this chamber is maintained continuously under pressure, by reason of the fact that the upper end of the chamber being closed, the air above the liquid is trapped and placed under pressure. A discharge pipe 23 projecting downwardly into the reduced portion 19 of the chamber (FIG. 3) extends upwardly through the cylindrical portion 18 and is connected by a standard connection 24 with a T connection 25 terminating at one end in a pressure relief valve 26 and connected at its other end to a hose 27 which terminates in the spray nozzle 28 or other preferred type of spray distributor.

The cylindrical pressure storage chamber 18 and the pump piston at its lower end are suspended from a head 29 vertically reciprocable in guideways 31 and 32 formed in a U-shaped member 33 from the base portion of which projects a bearing 34 for the driven shaft 14.

The inner end of the shaft 14 is provided with a crank pin 35 carrying a slide 36 adapted to reciprocate in a horizontal slot 37 formed in the head 29. It will be manifest that by reason of this type of connection between the driven shaft 14 and the cylindrical chamber 18, rotation of the shaft 14 will impart a vertical reciprocatory motion to the head 29 and the chamber and pump piston suspended therefrom to thereby actuate the pump to cause a continuous delivery of spraying material through the hose 27. A paddle or splasher 38 mounted on the cylinder 18 maintains the liquid in the tank in a state of agitation during the operation of the pump.

The operating mechanism including the head 29 exposed to view in FIG. 2 is enclosed by a plate 39 (FIG. 3) attached to the exposed ends of the U-shaped member 33 by bolts 41 or other preferred attaching means.

The pump which, as previously explained, is introduced into the tank through the opening 17 is carried, together with its described operating mechanism, upon a column or post 42 which, as will be apparent from FIG. 2, is preferably of channel shape and is rigidly connected at its upper end to the base of the U-shaped member 33, which projects laterally forming a ledge or table 43. The top of the tank beneath this table has a reinforcing bar or plate 44 welded or otherwise secured to the inner face of the top. Said top and the reinforcing plate are provided with spaced apart openings adapted to receive the studs 45 depending from the shaft 43. The insertion of the studs 45 into the openings, positions the upper end of the pump which is held against lateral movement but is capable of disconnection from the tank by lifting the unit.

The bottom of the tank is provided with a guide and retainer 46 having downwardly converging side walls to receive the lower end of the column 42 and having a central platform 47 provided with an opening to receive a pin 48 welded or otherwise rigidly attached to the lower end portion of the column 42. This pin positions and holds the lower end of column 42 against lateral displacement.

When it becomes desirable to remove the pump unit from the tank, the drive belt 12 is slipped off one of the pulleys, thereby releasing the unit for vertical movement so that the whole unit may be lifted out of the tank for inspection, repairs, or other purposes.

The reassembly of the unit with the tank is readily accomplished by simply lowering the unit through the opening in the tank top until the pin 48 is engaged in the opening in the holding member 46 and the pins or studs 45 are engaged in the openings in the top and underlying reinforcing plate 44. Replacement of the driving belt on the pulleys securely holds the pump unit in operative position in the tank without the employment of screws, bolts or other holding or anchoring means.

It should be apparent from the foregoing that we have provided a spraying apparatus in which the pump and its operating mechanism assembled on a removable column constitute a removable unit which may be readily assembled with and disassembled from the tank by simply disconnecting the driving belt and lifting the unit out without the necessity of releasing any anchors or unfastening any locking or holding devices.

The essence of our invention, which may be embodied in structures differing substantially from that here disclosed for illustrative purposes, is defined in the following claims.

We claim:

1. A spraying apparatus comprising a portable tank, a motor mounted adjacent thereto, a pump unit mounted in said tank consisting of a vertical supporting column, a pump having reciprocating pumping elements and pump operating mechanism mounted on said column, said pump having a head slidably mounted in the pump operating mechanism, a horizontal slot in said pump head, a slidable block mounted in the slot for horizontal movement, a drive shaft in said pump operating mechanism, an eccentrically mounted pin on one end of said shaft and mounted in said slidable block to permit vertical movement of said pumping elements without horizontal movement thereof, a pulley mounted on the opposite end of said shaft, detachable drive means between said motor and said pulley, a holding member provided with an opening located in the top of said tank, a holding member provided with an opening located in the bottom of said tank, and studs carried by said pump unit in position to engage in the openings of said members whereby said unit is detachably positioned in said tank.

2. In a spraying apparatus, the combination of a portable tank, a motor adjacent to said tank, a pump unit removably mounted in said tank comprising a column, a first base mounted on the lower end of said column, a pump mounted on said base, a head on the upper end of the pump, a member mounted on the opposite end of the column and provided with a base, a pump actuating mechanism mounted on said last mentioned base, means connecting the pump actuating mechanism with the head of the pump, pulley means connected to said pump actuating mechanism, a detachable driving connection between said motor and said pulley, a guide and retainer in the bottom of said tank on which said first base is supported, said guide and retainer containing an opening, a holding member provided with openings in the top of said tank, and studs carried by the pump unit in position to engage said openings whereby said unit is detachably mounted in said tank.

3. A spraying apparatus comprising a portable tank, a power unit mounted adjacent thereto, a readily detachable and removable pump unit mounted in said tank comprising a vertical supporting column, a pump having reciprocating pumping elements and pump operating mechanism mounted on said column including a slotted supporting member detachably mounted on the top of said tank and from which said column depends, a head vertically reciprocable in said slotted supporting member and carrying said pumping elements, a driven shaft rotatable in said supporting member and having a crank pin and slide on one end for reciprocation in said head, a pulley mounted on the other end of said shaft, a detachable driving connection between said power unit and said pulley whereby said pump unit is held in operating position by said detachable driving connection, a guide and retainer in the bottom of the tank for receiving and detachably supporting the lower end of the supporting column, said guide and retainer and the top of the tank upon which said supporting member is mounted having openings and said supporting member and supporting column having depending studs received in said openings for detachably retaining said pump unit in the tank.

4. A spraying apparatus comprising a portable tank, a power unit mounted adjacent said tank, a pump unit detachably and removably mounted in said tank comprising a supporting column, a pump having reciprocating pumping elements and pump operating mechanism mounted on said column including a support positioned upon the top of the tank and from the underside of which said supporting column depends into the tank, said support being slotted at one end and having a bearing at the other end, a slotted head carrying said pumping elements and mounted for vertical movement in the slotted end of said support, a driven shaft journalled in said bearing and provided at one end with a crank pin and a slide with the slide mounted for vertical movement in the slot of said head upon rotation of said shaft, a pulley mounted on the other end of said shaft, a detachable driving connection between said power unit and said pulley, means mounted upon the bottom of the tank for receiving and detachably supporting the lower end of the supporting column, said means and the top of the tank upon which said support is mounted having openings and said support and supporting column having depending studs adapted to be received in said openings to detachably and removably mount and retain the pump unit in operative position in the tank.

5. A spraying apparatus as set forth in claim 4, in which detachment of said driving connection between said power unit and pulley frees the pump unit and permits it to be bodily lifted and removed from the tank.

6. A spraying apparatus comprising a portable tank, a power unit mounted adjacent said tank, a pump unit detachably and removably mounted in said tank comprising an upright supporting column, a pump having reciprocating pumping elements and pump operating mechanism mounted on said column including a support positioned upon the top of the tank for suspending said supporting column and pump into the tank, a driven shaft for operating the pump journalled in said support, a head carrying said pumping elements, means connected to one end of said shaft for vertically reciprocating said head and pumping elements in said tank, a pulley mounted on the other end of said shaft and having a detachable driving connection with said power unit, means mounted upon the bottom of the tank for receiving and detachably supporting the lower end of the supporting column, said means and the top of the tank upon which said support is mounted having openings and said support and supporting column having depending projections adapted to be received in said openings to detachably and removably mount and retain the pump unit in operative position in the tank.

References Cited in the file of this patent

UNITED STATES PATENTS

| | | |
|---|---|---|
| 481,718 | Salisbury | Aug. 30, 1892 |
| 929,343 | Swearingin | July 27, 1909 |
| 2,111,439 | Squyars | Mar. 15, 1938 |
| 2,231,229 | Spreng | Feb. 11, 1941 |
| 2,243,610 | Spreng | May 27, 1941 |
| 2,590,007 | Griswold | Mar. 18, 1952 |
| 2,787,403 | Carr et al. | Apr. 2, 1957 |